J. DRAENERT.
ARTIFICIAL STONE PRESS.
APPLICATION FILED APR. 13, 1908.
924,540.
Patented June 8, 1909.
5 SHEETS—SHEET 1.
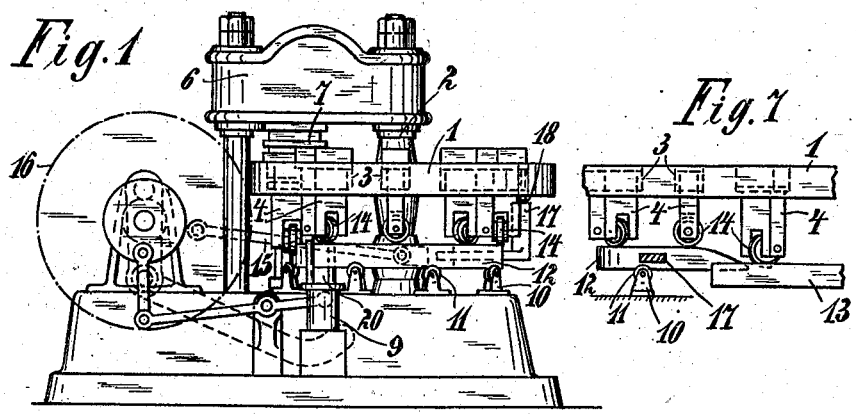
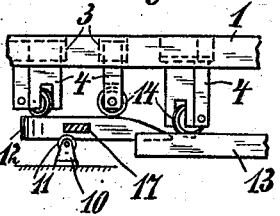
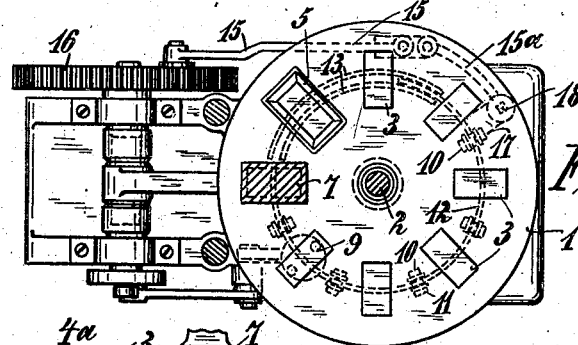
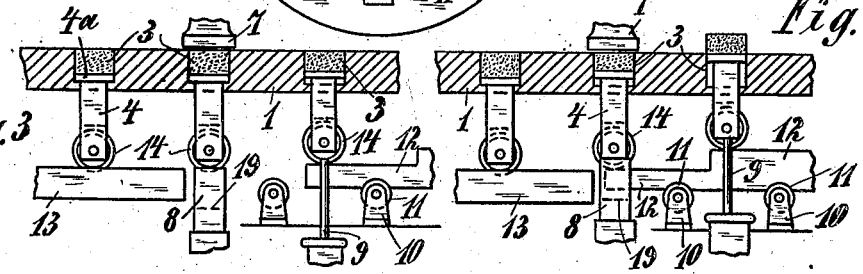
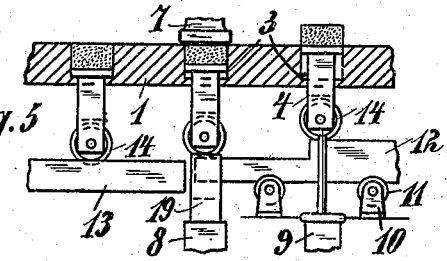
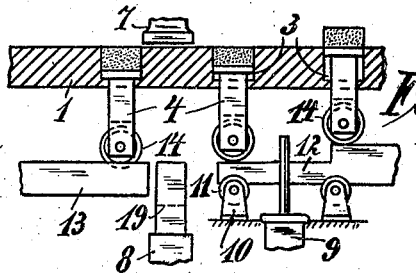
Witnesses.
Inventor:
Johannes Draenert
by Attorney J. DRAENERT.
ARTIFICIAL STONE PRESS.
APPLICATION FILED APR. 13, 1908.
924,540.
Patented June 8, 1909.
5 SHEETS—SHEET 2.
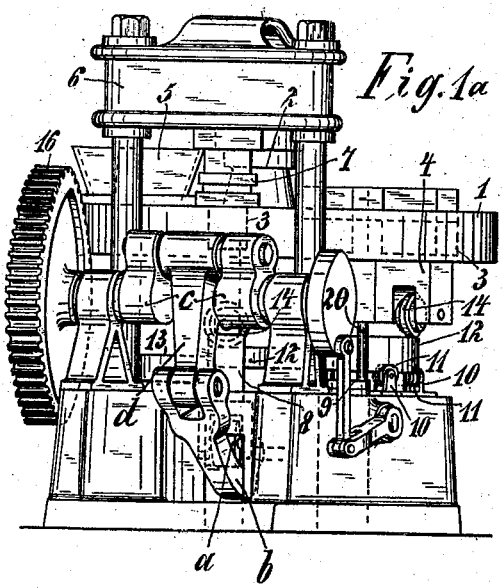
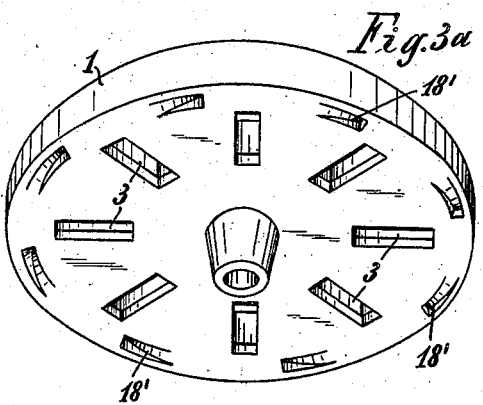
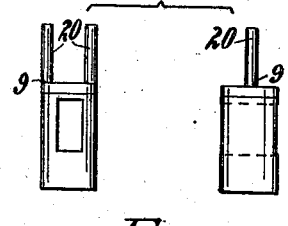
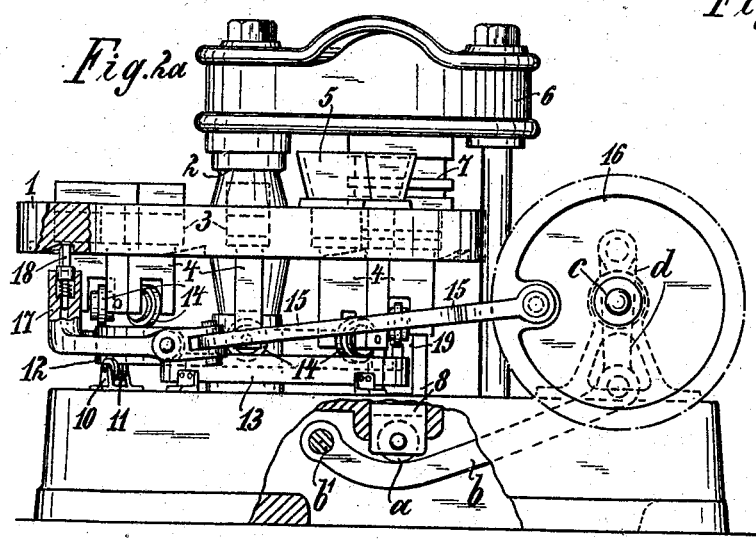
Witnesses:
Inventor:
Johannes Draenert
by Eustace N. Hopkins
Attorney J. DRAENERT.
ARTIFICIAL STONE PRESS.
APPLICATION FILED APR. 13, 1908.
924,540.
Patented June 8, 1909.
5 SHEETS—SHEET 3.
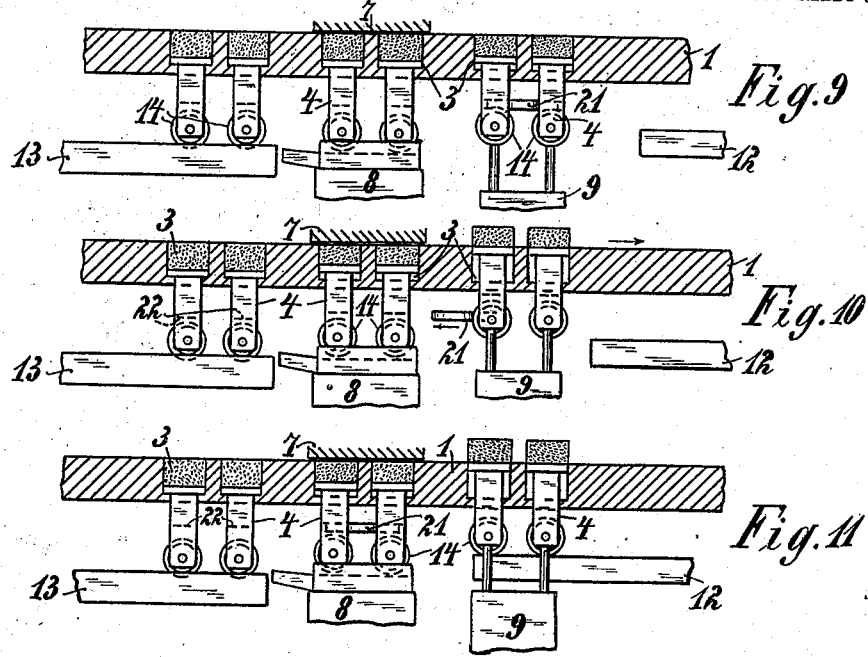
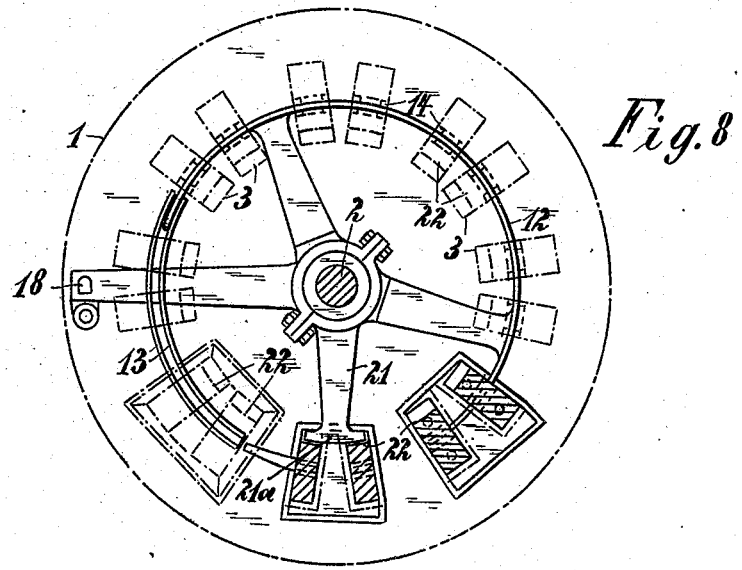
Witnesses:
Inventor:
Johannes Draenert
by Ernest W. Hopkins
Attorney

J. DRAENERT.
ARTIFICIAL STONE PRESS.
APPLICATION FILED APR. 13, 1908.

924,540.

Patented June 8, 1909.
5 SHEETS—SHEET 4.

Witnesses:

Inventor:
Johannes Draenert
by Eustace H. Hopkins
Attorney

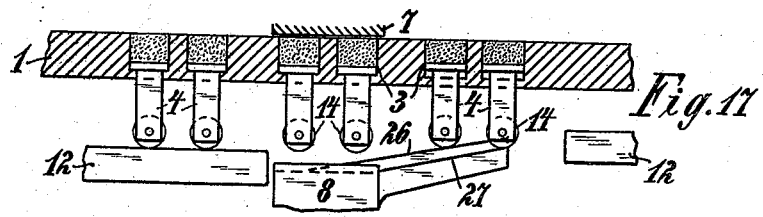
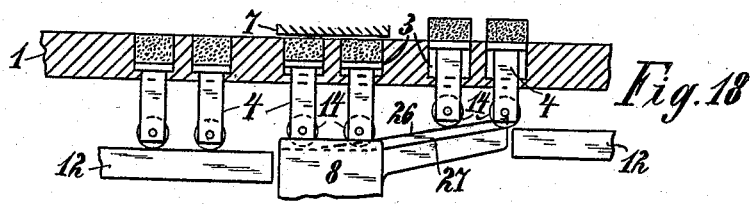
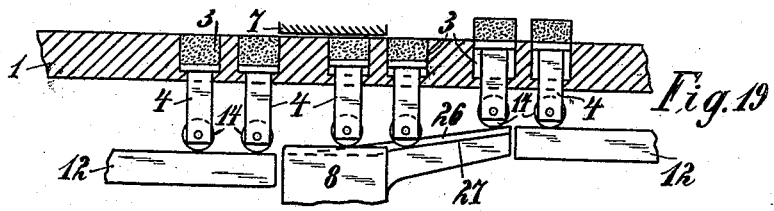
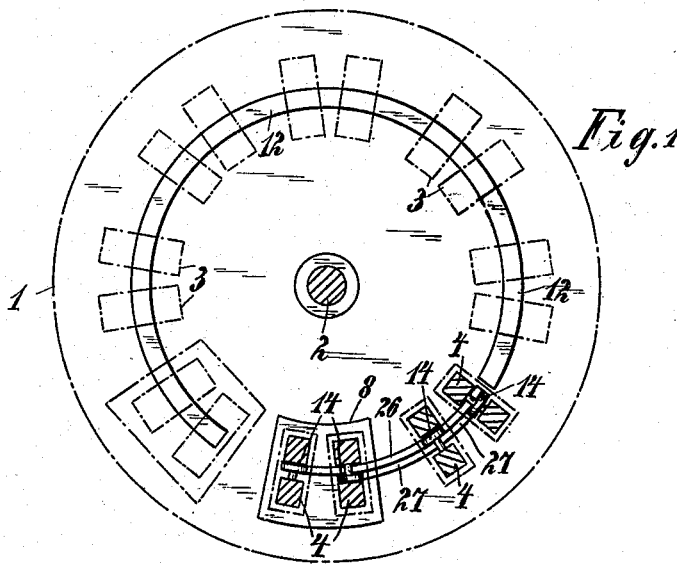

UNITED STATES PATENT OFFICE.

JOHANNES DRAENERT, OF EILENBURG, GERMANY.

ARTIFICIAL-STONE PRESS.

No. 924,540.  Specification of Letters Patent.  Patented June 8, 1909.

Application filed April 13, 1908. Serial No. 426,816.

*To all whom it may concern:*

Be it known that I, JOHANNES DRAENERT, a citizen of the German Empire, and resident of Eilenburg, Kingdom of Saxony, Germany, have invented certain new and useful Improvements in Artificial-Stone Presses, of which the following is a description.

The present invention relates to presses generally and more particularly to presses for making artificial stone slabs and the like, in which the material is filled into a set of molds arranged around an intermittently rotated table. The molds are provided with a movable bottom or die and each die is successively raised by suitable mechanism to compress the contents of the mold against an upper matrix plate.

The class of molding machine generally is known and the object of the present invention is to provide means for letting the dies down easily after they have been raised to compress the mass, and further raised to push the compressed slab or the like out of the mold at the top. This object is attained by the employment of an annular cam ring, which is reciprocated back and forward while the table is continually intermittently rotated in one and the same direction. One end of the said cam ring is provided with an inclined cam surface along which the die rolls off from the higher level necessary to eject the slab down to the low level which it must occupy while the mold is being filled with the mass previous to the compressing operation.

In order to render the present specification easily intelligible reference is had to the accompanying drawing in which similar numerals of reference denote similar parts throughout the several views.

Figure 13:
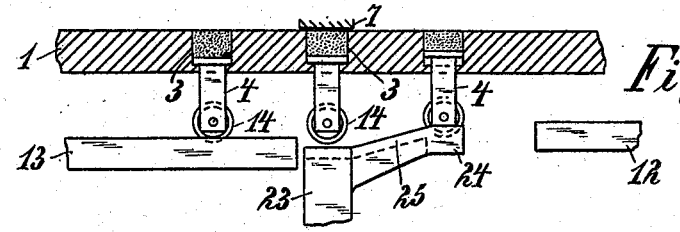
Figure 14:
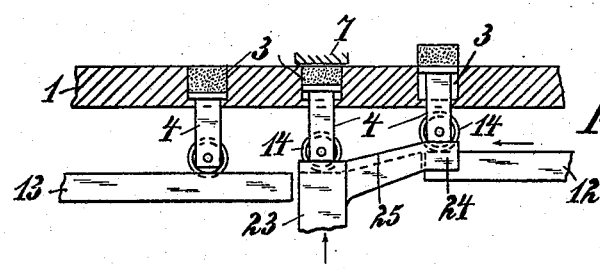
Figure 15:
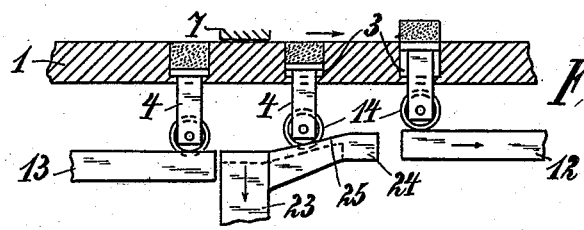
Figure 12:
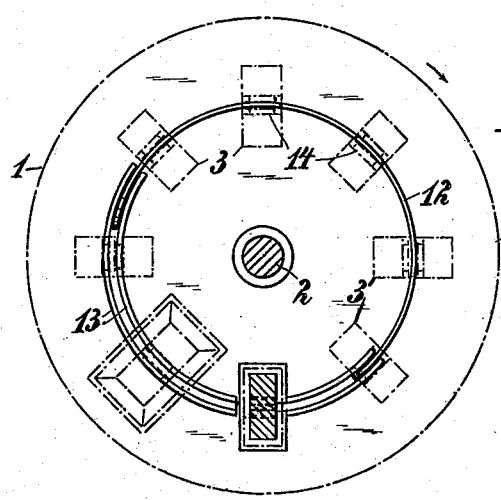

Figure 1 is a side elevation of a complete press Fig. 1ª is a perspective view of the press and Fig. 2 is a plan of the same. Fig. 2ª is a side elevation seen from the opposite side of Fig. 1. Figs. 3 to 7 are a series of diagrammatical views showing the operation of the annular cam at the various positions of its stroke. Fig. 3ª is a perspective view of the table seen from underneath. Fig. 4ª is a detail view showing how the cam is mounted. Fig. 5ª shows detail views of one of the plungers and Fig. 6ª shows detail views of a second plunger. Fig. 8 is a plan of a modified form of the press showing pairs of dies being operated simultaneously and Figs. 9 to 11 are further diagrammatical views showing the action of the dies and cams. Fig. 12 is a plan view of a more simple embodiment of the invention and Figs. 13 to 15 are a set of diagrams similar to those of Figs. 9 to 11. Fig. 16 is a plan view of yet another modification, in which the stamp and the raising plunger are combined in one piece and Figs. 16 to 19 are the diagrams illustrating the action of the parts.

Referring first to Figs. 1 to 7:—The press comprises the table 1 adapted to rotate on the center pin 2 and having the desired number of molds 3 arranged therein. Each mold is provided with a movable bottom die having its stem 4 extending out and advantageously provided with an antifriction roll 14. The filling device for the molds is of known construction and indicated at 5 and upon the cross arm 6 is fitted the matrix plate 7 under which the molds pass during the compression period. Beneath the table is mounted the vertically reciprocated stamp 8, which raises the dies 4ª successively to compress the contents of the mold and beyond this stamp the vertically reciprocating plunger 9 which pushes the dies up to eject the compressed slab. The mechanism for operating these parts is known and forms no part of the present invention. A cam in the form of a mutilated ring 12 is provided beneath the table 1 and is advantageously mounted to ride in the grooves of rolls 11 mounted in bearings 10. This cam has an arm 17 connected up by suitable links to a connecting rod 15 which is operated by a crank pin on the gear 16 and thus rocks the said cam in the horizontal plane backward and forward at each revolution of the said gear. The arm 17 actuating the cam 12 is prolonged upwardly and carries a spring pressed pawl 18 at its upper end adapted to coöperate with inclined recesses 18′ on the under side of the table, (Fig. 3ª) of a ratchet nature, so that when the arm 17 is moved in one direction the table will be turned a certain angle but will remain stationary when the arm is moved backward again, owing to the fact that the spring pressed pawl 18 slides along the inclined surface of the recess. When the pawl is withdrawn it slides along the under surface of the table until it reaches the next recess into which it is forced by the action of its spring and, coöperating with the vertical wall of said recess, will, at the next forward movement of the arm 17 turn the table another step. On the backward movement of the pawl 18 the table is held stationary by the plungers which commence to enter the molds. The cam 12 coöperates with a stationary arc-shaped rail 13 on which the rolls of the dies 4ª run, when the latter are in their lowest position, i. e. when the molds are being filled. The stamp 8 is provided with a slot 19 and the plunger 9 is also slotted to allow the end of the cam 12 to pass through them. The operation of the cam and rail take place in the following manner:—When one mold 3 has been filled, the material in the next mold is compressed and the slab in the one before that is being lifted out of its mold by the plunger 9. In Fig. 3 the left hand die is still in its lowest position and its roll is running on the rail 13. The next die is about to be raised by the stamp 8 to compress the contents and the right hand die is on the lower end of the cam 12 above the plunger 9, which is about to lift the slab out of the mold. The plunger 8 is operated by a curved lever $b$ pivotally mounted in the bed plate at $b'$ and connected by a link $d$ to a crank of the shaft $c$, on which the gear 16 is keyed. The roll $a$ of plunger 8 rests on this lever $b$ and, when the latter is raised by the crank the plunger is also raised, and falls by gravity as the lever descends. In Fig. 4 the plungers 8 and 9 have both been raised and the cam 12 has been advanced to the right lying with its end in the slots of the stamp and plunger and beneath the rolls of the central and right hand die, the latter resting on the elevated part of the said cam. In Fig. 5 the cam 12 commences its return stroke and takes the table with it at this movement, and bringing the next mound under the matrix plate, while the stamp and plunger are again lowered and then the whole is repeated. The opposite end of the cam 12 is provided as at 12ª in Fig. 7 with an inclined surface so that on the next movement of the cam alone, when the table is stationary, i. e. the return movement of the connecting rod 15, the inclined surface 12ª will gently lower the end die down on to the rail 13 as will be readily understood.

In the embodiment shown in Figs. 8 to 11, it is sometimes necessary when working with gritty materials which are liable to get between the stamp and its guide, to provide the stamp with a hood or cover as at 8ª, in which case it is not possible to provide the same with the slot 19. In this case the front end of the cam 12 is shortened so that it will not extend beyond the stamp and an arm adapted to swing around the center pin 2 as at 21 carries a short piece of the cam independently as at 21ª, which engages a horizontal slot 22 of the die stems and retains them in their raised position when the table is rotated to bring them over the ejector plunger (Fig. 11). In this case the cam 12 is not supported on rolls, but on arms or spokes which swing on the center pin 2, as will be readily understood. In this case also the molds and dies are duplicated so that two mounds pass through the various operations simultaneously.

In order to simplify the press for the cheaper class of machine, the stamp and plunger may be combined to form a single head, as at 23, 24, in which case the two parts 23 and 24 are connected up by an inclined surface 25, which is inclined at such an angle that by the composite movement i. e. the movement of the table with the die and the simultaneous downward movement of the stamp and plunger head, the die stem 4 will be kept at a substantial level, until it has reached the end 24 of the head, when at the next upward movement of the head, the next die behind will compress the contents of the mold and the part 24 will eject the contents of the mold over it. The end of the cam 12 passes into a slot in 24 and takes the die and mold on at the next movement of the cam and table. The incline between the parts 23 and 24 may be made so steep that the movement of the table alone, across the same will have the effect of ejecting the slab, irrespective of the downward movement of the head. This is shown at Figs. 16 to 19, in which case the apparatus is arranged also for pairs of molds.

In working with pairs of molds the incline will have to be duplicated, being formed of two parallel rails 26 and 27. One of these rails is longer and arranged higher than the other and the rolls of each pair of molds are displaced as regards each other so that both rolls of each pair contact with the rails in one and the same horizontal plane and, therefore, possess, while running on the rails, always the same horizontal level as against each other. Thereby it is rendered possible to eject from both molds of each pair simultaneously.

I claim as my invention:—

1. In a press having a series of molds, an intermittently rotated table to carry the same and vertically movable dies one in each mold, having a stem extending out at the bottom of the mold, the combination of a cam, in the form of a mutilated ring and means for rocking the cam backward and forward, means for coupling the table to it at its forward movement, the said cam extending under all the said mold die stems, and having an incline at its rear end to gradually sink each die-stem as it leaves the said cam substantially as described.

2. In a press of the class specified, the combination of a series of mold dies having downwardly extending stems, an annular cam extending beneath said stems, a roll at the end of each stem to run on said cam, a stationary rail, extending under certain of the said stems, and at a lower level than the main surface of said cam, an inclined rear end to said cam extending down to the level of said rail, means for reciprocating said cam backward and forward and means for concentrically moving the said molds at one movement of the said cam, and then stopping them until the next movement of the cam in the same direction.

3. In a press of the class specified, having an intermittently rotated table and a series of molds therein, the combination of a vertically reciprocated stamp and plunger over which the said molds are successively brought, vertically movable dies in said molds having stems extending out at the bottom, a mutilated ring cam extending under certain of the stems and means in connection with the said cam to receive the die stems after they have been raised to compress and eject, and to lower them gradually subsequently when the respective mold is again filled.

4. In a press of the class specified having an intermittently rotated table and a series of molds therein, a vertically movable die in each mold and a stem to the same projecting out of the bottom of the mold, the combination of a combined stamp and plunger and means for vertically reciprocating the same, a horizontally reciprocated cam in the form of a mutilated ring to engage under certain of the stems of said dies, and an inclined surface between the said combined stamp and plunger to retain the die in the raised position during the composite movements of the stamp and die and the cam substantially as described.

5. In a press of the class specified, the combination of a series of molds, an intermittently rotated table to carry the same, a stamp and plunger to compress and eject the contents of the molds consecutively, a vertically movable die at the bottom of each mold, and a cam in the form of a mutilated circle, extending concentrically under said dies, and means in connection with said dies and cam, to sustain each raised die in its raised position, after compression and ejection, and for gradually lowering each die successively previous to its being again filled substantially as described.

In testimony whereof I affix my signature in the presence of two witnesses.

JOHANNES DRAENERT.

Witnesses:
MORITZ SPREER,
RUDOLPH FRICKE.